US012768760B2

(12) United States Patent
Birnbaum et al.

(10) Patent No.: US 12,768,760 B2
(45) Date of Patent: Oct. 20, 2026

(54) NON-CONTACT, AUTOGENOUS MATERIAL ASSESSMENT

(71) Applicant: The Government of the United States of America, as represented by the Secretary of the Navy, Arlington, VA (US)

(72) Inventors: Andrew J. Birnbaum, Washington, DC (US); John C. Steuben, Washington, DC (US); Anna Lee Kofer Rawlings, Alexandria, VA (US); Benjamin D. Graber, College Park, MD (US); Athanasios Iliopoulos, Bethesda, MD (US); John G. Michopoulos, Millsboro, DE (US); Heonjune Ryou, Hanover, MD (US)

(73) Assignee: The Government of the United States of America, as represented by the Secretary of the Navy, Arlington, VA (US)

(*) Notice: Subject to any disclaimer, the term of this patent is extended or adjusted under 35 U.S.C. 154(b) by 299 days.

(21) Appl. No.: 18/800,684

(22) Filed: Aug. 12, 2024

(65) Prior Publication Data

US 2025/0067645 A1 Feb. 27, 2025

Related U.S. Application Data

(60) Provisional application No. 63/578,772, filed on Aug. 25, 2023.

(51) Int. Cl.

*G01N 3/06* (2006.01)
*G01N 3/08* (2006.01)

(52) U.S. Cl.

CPC ............... *G01N 3/068* (2013.01); *G01N 3/08* (2013.01); *G01N 2203/0226* (2013.01)

(58) Field of Classification Search

CPC ................................ G01N 3/08; G01N 3/068

(Continued)

(56) References Cited

U.S. PATENT DOCUMENTS 4,322,162 A 3/1982 McKelvie et al.
4,591,906 A 5/1986 Vachon (Continued)

FOREIGN PATENT DOCUMENTS

| | | | | |
|---|---|---|---|---|
| CA | 2843892 C | * | 8/2019 | ........... G01B 11/165 |
| JP | 2022539103 A | * | 9/2022 | ............... G06T 7/13 |
| TW | 201702569 A | * | 1/2017 | ........ G01M 11/0242 |

*Primary Examiner* — John Fitzgerald

(74) *Attorney, Agent, or Firm* — US Naval Research Laboratory; Jorie L. Stroup

(57) ABSTRACT

A non-contact material assessment system and method are provided. In embodiments, a system includes: a radiation source generating a pattern of diffracted elements; a detector configured to: capture a first image of a first diffracted element when a sample is in an initial state, and a second image when the sample is in a second state; and capture a first image of a second diffracted element when the sample is in the initial state, and a second image when the sample is in the second state; and a controller to: determine a displacement of the first diffracted element based on the first and second images of the first diffracted element; determine a displacement of the second diffracted element based on the first and second images of the second diffracted element; and determine a characteristic of the sample over based on the displacement of the first and second diffracted elements.

20 Claims, 5 Drawing Sheets

(58) Field of Classification Search
USPC .......... 73/800; 356/32, 616, 618; 702/42, 43
See application file for complete search history.

(56) References Cited

U.S. PATENT DOCUMENTS

| | | | | |
|---|---|---|---|---|
| 4,722,600 | A * | 2/1988 | Chiang ................ | G01B 11/165 250/237 G |
| 4,939,368 | A * | 7/1990 | Brown ................. | G01B 11/165 356/521 |
| 5,065,331 | A | 11/1991 | Vachon et al. | |
| 5,682,236 | A | 10/1997 | Trolinger et al. | |
| 6,563,570 | B1 | 5/2003 | Okada | |
| 7,036,364 | B2 * | 5/2006 | Swillo ................... | H04L 9/0852 73/849 |
| 8,818,078 | B2 * | 8/2014 | Telfer .................... | G06T 7/0004 382/152 |
| 9,207,154 | B2 * | 12/2015 | Harding ................... | G01N 3/08 |
| 10,801,833 | B2 | 10/2020 | Georgeson et al. | |
| 12,055,382 | B2 * | 8/2024 | Nagashima .......... | G01B 11/165 |
| 2005/0072236 | A1 | 4/2005 | Heyman et al. | |
| 2011/0106459 | A1 * | 5/2011 | Christ, Jr. ............ | G01N 21/892 702/42 |
| 2012/0176629 | A1 * | 7/2012 | Allen ................. | G01D 5/34746 356/616 |
| 2016/0161249 | A1 * | 6/2016 | Ri ....................... | G01M 5/0058 702/42 |
| 2018/0188188 | A1 * | 7/2018 | Zhao .................. | G01N 21/8806 |
| 2019/0183344 | A1 | 6/2019 | Gallippi et al. | |
| 2021/0131888 | A1 * | 5/2021 | Rizos .................... | B61L 23/045 |

* cited by examiner

NON-CONTACT, AUTOGENOUS MATERIAL ASSESSMENT

CROSS-REFERENCE TO RELATED APPLICATIONS

This application is a Nonprovisional of, and claims the benefit of priority under 35 U.S.C. § 119 based on, U.S. Provisional Patent Application No. 63/578,772 filed Aug. 25, 2023. The Provisional application and all references cited herein are hereby incorporated by reference into the present disclosure in their entirety.

FEDERALLY SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; nrltechtran@us.navy.mil, referencing Navy Case No. 211736-US2.

BACKGROUND OF THE INVENTION

Aspects of the present invention relate generally to materials assessment and, more particularly, to non-contact, autogenous material assessment. Current techniques for assessing material properties in extreme environments (e.g., at significantly elevated temperatures) suffer from significant limitations. For example, even the most basic of structural material descriptors, Young's modulus (elastic stiffness), is subject to significant uncertainty due to an inability to measure strain in the gauge section of a standard uniaxial test coupon. Typically, at high temperatures, strain is "estimated" by assessing the change in distance between the grips of a tensile test system as a load is applied. However, this results in measurement errors exceeding 200-300% even at room temperature due to a number of factors including non-uniform sample extension as well as test-apparatus compliance. This effect is particularly exacerbated at very high temperatures due to an additional number of underlying mechanisms, such as thermal expansion and creep.

At temperatures above 1,600° C., contact-based material assessment techniques are not suitable due to the thermal limitations of the materials from which the contact probes are constructed. One non-contact based approach for sensing in-plane deformation of a surface is set forth in U.S. Pat. No. 4,322,162. The approach of U.S. Pat. No. 4,322,162 combines a plurality of diffracted beams from a patterned surface, and senses an average wavelength, due to interference, of a spatial intensity variation transverse to the combined beams. Such a method does not take into account errors introduced by any unintentional movement of the sample during testing or any misalignment of system elements. Furthermore, it relies on configuring the diffracted beams in an interferometric configuration, thus increasing the complexity of the approach.

With regard to non-contact approaches such as digital image correlation (DIC), there have been a number of demonstrations at significantly elevated temperatures, though they are subject to a wide array of experimental constraints and material limitations. The first of these is substantial blackbody radiation, essentially drowning out measurement signals, necessitating the implementation of filters and further complicated optics setups.

DIC typically requires that the surface of a sample be covered in a speckle pattern, or have intrinsic characteristic features which are then tracked with a camera as strain evolves in the material under load. However, at significantly elevated temperatures, surface patterns tend to delaminate (due to oxidation, lattice mismatch, or differentials in coefficients of thermal expansion (CTE)), diffuse into the substrate, or simply do not provide enough optical contrast. Therefore, there remains a need for a system and method enabling accurate non-contact analysis of material characteristics (e.g., strain) in a variety of harsh environments.

SUMMARY OF THE INVENTION

In a first aspect of the invention, there is a non-contact material assessment system including: a radiation source configured to apply electromagnetic radiation to a sample including a pattern of autogenous diffractive elements, thereby generating a pattern of diffracted elements; at least one detector configured to: capture a first image of a first diffracted element when the sample is in an initial state, and a second image of the first diffracted element when the sample is subjected to an external stimulus in a second state; and capture a first image of a second diffracted element when the sample is in the initial state, and a second image of the second diffracted element when the sample is subjected to the external stimulus in the second state; and a controller comprising at least one computer processor, one or more computer readable storage media, and program instructions collectively stored on the one or more computer readable storage media. In embodiments, the program instructions are executable to: determine a displacement of the first diffracted element based on the first and second images of the first diffracted element; determine a displacement of the second diffracted element based on the first and second images of the second diffracted element; and determine a characteristic of the sample over an assessment period based on the displacement of the first diffracted element and the displacement of the second diffracted element.

In implementations, the system further includes a means for applying the external stimulus to the sample. In embodiments, the system may include a testing environment configured to house the sample and control an environment of the sample during the assessment period. The testing environment may include a cooler or a heater, for example. The characteristic determined may be: strain, coefficient of thermal expansion, phase transformation temperature, or yield stress, for example. The autogenous diffractive elements may be: indentations in a surface of the sample, raised surface features of the sample, or a combination of indentations and raised surface features of the sample. In implementations, the electromagnetic radiation comprises wavelengths within the visible spectrum. The stimulus may be: thermal stress, mechanical stress, or electromagnetic excitation, for example.

In some implementations, the at least one detector comprises a first imaging sensor and a second (time-synchronized) imaging sensor, wherein: the first imaging sensor is configured to capture the first image of the first diffracted element when the sample is in the initial state, and the second image of the first diffracted element when the sample is subjected to the external stimulus in the second state; and the second imaging sensor is configured to capture the first image of the second diffracted element when the sample is in the initial state, and the second image of the second diffracted element when the sample is subjected to the external stimulus in the second state. The system may include one or more optical elements configured to redirect the electromagnetic radiation or one or more diffracted elements of the pattern of diffracted elements.

In another aspect of the invention, there is a method of performing a non-contact material assessment, including: applying electromagnetic radiation to a sample including a pattern of autogenous diffractive elements, thereby generating a pattern of diffracted elements; capturing, by at least one detector, a first image of a first diffracted element when the sample is in an initial state, and a second image of the first diffracted element when the sample is subjected to an external stimulus in a second state; capturing, by the at least one detector, a first image of a second diffracted element when the sample is in the initial state, and a second image of the second diffracted element when the sample is subjected to the external stimulus in the second state; determining, by a controller, a displacement of the first diffracted element based on the first and second images of the first diffracted element; determining, by the controller, a displacement of the second diffracted element based on the first and second images of the second diffracted element; and determining, by the controller, a characteristic of the sample over an assessment period based on the displacement of the first diffracted element and the displacement of the second diffracted element.

The method may further include forming the pattern of autogenous diffractive elements on the sample. In implementations, the forming the pattern of autogenous diffractive elements comprises sputter depositing material on a surface of the sample; or removing material from the surface of the sample. In implementations, the method further includes applying the external stimulus to the sample, and the external stimulus may be thermal stress, mechanical stress, or electromagnetic excitation. In embodiments, the determining the characteristic over the assessment period is further based on brightness or intensity of the first and second diffracted element over the assessment period. The stimulus may be thermal stress, mechanical stress, or electromagnetic excitation, for example.

In implementations, the at least one detector comprises a first imaging sensor and a second imaging sensor, and wherein: the first imaging sensor is configured to capture the first image of the first diffracted element when the sample is in the initial state, and the second image of the first diffracted element when the sample is in subjected to the external stimulus in the second state; and the second imaging sensor is configured to capture the first image of the second diffracted element when the sample is in the initial state, and the second image of the second diffracted element when the sample is subjected to the external stimulus in the second state. The method may further include adjusting a control on an environment housing the sample to subject the sample to a predetermined environment during the assessment period. In embodiments, the testing environment comprises a cooler or a heater.

BRIEF DESCRIPTION OF THE DRAWINGS

Aspects of the present invention are described in the detailed description which follows, in reference to the noted plurality of drawings by way of non-limiting examples of exemplary embodiments of the present invention. The drawings are not intended to represent an accurate scale of all objects depicted.

DETAILED DESCRIPTION

Aspects of the present invention relate generally to materials assessment and, more particularly, to non-contact, autogenous material assessment. In embodiments, a non-contact, material assessment system and method are provided that enable non-contact autogenous material assessment in extreme environments (e.g., high temperatures, gas flow velocities, etc.). In implementations, a pattern of diffractive autogenous elements are formed on or in a surface of a sample to be tests. The term diffractive autogenous element as used herein refers to a portion of a sample to be tested that is made up of the material of the sample itself, and which is configured to reflect and diffract electromagnetic radiation (e.g., light) applied to the sample surface. In one example, the diffractive autogenous element is an indentation formed in a surface of the sample. In another example, the diffractive autogenous element is a raised surface feature extending from a surface of the sample.

Advantageously, implementations of the invention allow for a more accurate characterization of a sample material by enabling a non-contact assessment of the sample material that removes any errors due to unintentional movement of the sample material during analysis. Additionally, embodiments of the invention remove errors due to any misalignment of the light source with respect to the sample material. Error correction is accomplished via the recognition that an in-plane strain will result in respective (symmetric) diffractive element displacement in exactly opposite directions, while rigid-body rotation (e.g., due to loading apparatus misalignment, backlash, etc.) will result in diffracted element displacement in the same direction. A differential approach may then be leveraged to effectively cancel out systematic errors associated with rigid-body rotation.

Figure 1:
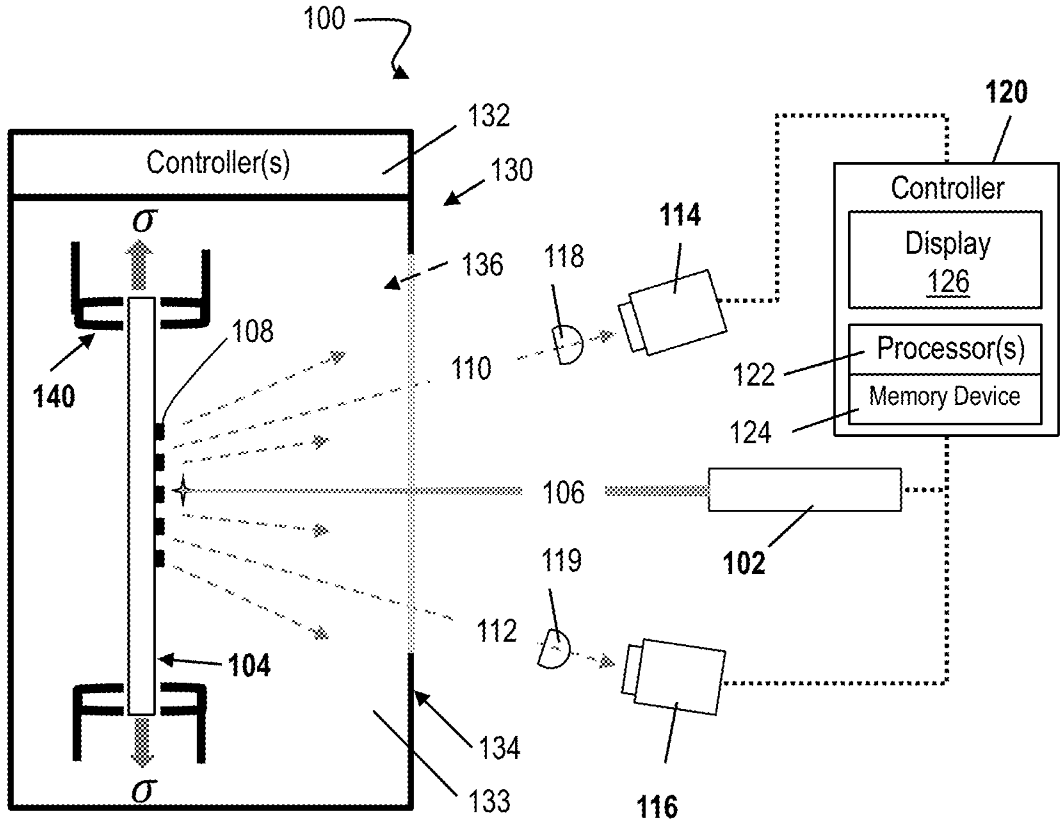
FIG. 1 depicts an exemplary non-contact, autogenous material assessment system in accordance with embodiments of the invention.

FIG. 1 depicts an exemplary non-contact, autogenous material assessment system 100 in accordance with embodiments of the invention. In the example of FIG. 1, the autogenous material assessment system 100 includes a radiation source (e.g., a light source) 102 configured to direct a source of electromagnetic radiation (e.g., coherent electromagnetic radiation or light) 106 at a sample material to be tested, such as a sample 104. In implementations, the electromagnetic radiation comprises wavelengths within the visible spectrum (e.g., between 400 nm-700 nm). In accordance with aspects of the invention, the sample material 104 includes a pattern of diffractive surface features or autogenous elements 108 (hereafter diffractive elements). In implementations, the diffractive elements 108 are made of or defined by the material of the sample itself, and are configured to reflect and diffract electromagnetic radiation (e.g., light) 106 applied by the radiation source 102 as electromagnetic radiation beams (e.g., light beams). See, for example, first and second diffracted light beams (signals) 110 and 112 depicted in FIG. 1. While FIG. 1 depicts the diffractive elements 108 as raised surface features, it should be understood that the diffractive elements 108 may be in the form of indentations, or a combination of raised features and indentations.

FIG. 1 also depicts first and second detectors 114 and 116 configured to receive reflected and diffracted electromagnetic radiation beams. More specifically, the example of FIG. 1 depicts the first detector 114 receiving a first diffracted light beam 110, and the second detector 116 receiving a second diffracted light beam 112. The first and second detectors 114 and 116 may be in the form of cameras (e.g., digital cameras) configured to record images of diffracted light. Optionally, one or more optical elements such as mirrors and lenses may be placed between the sample 104 and the respective first and second detectors 114 and 116. Optional optical elements are represented by 118 and 119 in FIG. 1. By way of example, one or more optical elements may be used to redirect the first and second diffracted light beams 110 and 112 to the first and second detectors 114 and 116.

In embodiments, a controller (e.g., computing device) 120 is configured to: obtain data (e.g., image data) from the first and second detectors 114 and 116, analyze the data using one or more processors 122 based on rules (e.g., software code) stored in a physical memory device 124, and display output data on a display 126.

Advantageously, system 100 enables non-contact analysis of samples and can be utilized in conjunction with a testing environment indicated at 130. In implementations, the testing environment is configured to house the sample 104 and provide a particular testing environment for the sample 104. The testing environment may be a customizable or extreme testing environment 130 such as a fluid tank, a high-temperature furnace or oven (i.e., heater), a cooler (e.g., freezer), or a wind tunnel, for example. In one example, the testing environment 130 is in the form of an oven configured to heat the sample 104 to a temperature greater than 1600 degrees Celsius. In some implementations, the testing environment 130 includes one or more controllers 132 for controlling an environment 133 within a housing 134. It should be understood that various gas/wind control and temperature control elements may be utilized in conjunction with the testing environment 130, such as heating elements, condensers, fans, engines, etc. In implementations, the testing environment 130 constitutes a means for controlling an environment within which the sample 104 is tested. It should be understood that a variety of environments may be desired for different testing scenarios, and the present invention is not intended to be limited to only the exemplary environments discussed herein.

As depicted in FIG. 1, a line-of-sight is established between the radiation source 102 and the sample 104. In implementations, a transparent or semi-transparent window (not shown) is mounted to the housing 134 and positioned between the environment 133 and the radiation source 102. Alternatively, the housing 134 may include an opening 136 such that the environment 133 within the housing 134 is open to or in communication with the surrounding environment. Optionally, an air curtain may be utilized to separate the environment 133 within the housing 134 from the environment external to the housing 134. While shown separately, in implementations, the one or more controllers 132 and the controller 120 may be combined into a single controller.

In use, a testing apparatus indicated at 140 is provided and configured to apply an external stimulus (e.g., an adjustable external excitation or a load) to the sample 104, such as thermal excitation, a mechanical load, and/or electromagnetic excitation. Various means for applying an external stimulus are available, and one of ordinary skill in the art would be able to determine which testing apparatus 140 to utilize based on the type of sample characterization desired. In implementations, the load comprises a longitudinal strain, lateral strain, volumetric strain or shear strain, and the testing apparatus 140 comprises a strain inducer. In the example of FIG. 1, opposing forces a are shown applied to respective opposing ends of the sample 104 by the testing apparatus 140 to strain the sample 104.

Figure 2:
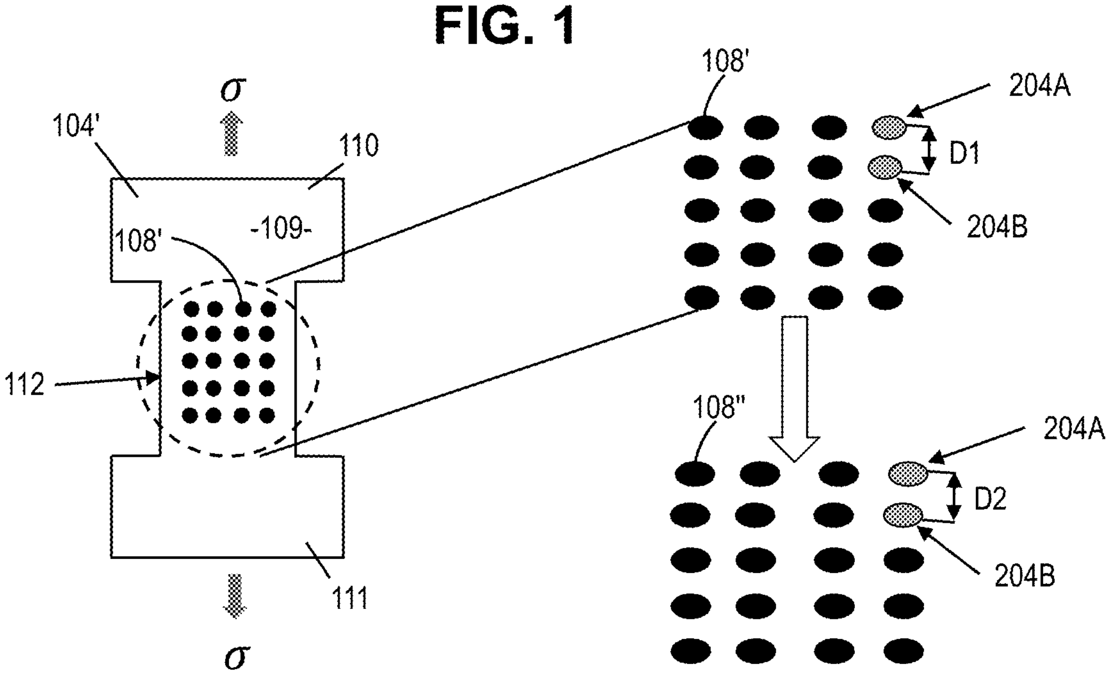
FIG. 2 depicts a pattern of diffractive elements of a test sample before and after an external stimulus is applied to the sample in accordance with embodiments of the invention.

FIG. 2 depicts a pattern of diffractive elements of a test sample 104' before and after an external stimulus is applied to the sample 104' in accordance with embodiments of the invention. More specifically, FIG. 2 depicts a pattern of diffractive elements 108' of a sample 104' before an external stimulus (i.e., a force a) is applied, and the pattern of diffractive elements after the force a is applied to the sample 104', indicated at 108". In the example of FIG. 2, the pattern of diffractive elements 108' is in the form of round indentations formed in a surface 109 of the sample 104'. The sample 104' is in a dog bone pattern, including upper and lower sections 110 and 111, and a central gauge section 112.

In practice, electromagnetic radiation (e.g., a beam of light) is directed at the pattern of diffractive elements 108', resulting in a first diffracted light pattern (not shown). Detectors (e.g., detectors 114 and 116) may capture images of respective portions of the diffracted light pattern. In the example of FIG. 2, when the sample 104' is in an initial state, a first detector (e.g., 114) captures a diffracted light image (not shown) of diffractive element 204A, and a second detector (e.g., 116) captures a second diffracted light image (not shown) of diffractive element 204B. An external stimulus (e.g., load $\sigma$) may then be applied to the sample 104' such that the sample 104' is in an influenced state, and the first and second detectors may capture new digital images of respective portions of the pattern of diffractive elements 108'. In the example of FIG. 2, the first and second detectors capture new diffracted light images of diffractive elements 204A and 204B. A displacement of the diffracted light images caused by the external stimulus is then determined by the controller 120, where the displacement is related to the distance D1, D2 between the actual diffractive elements 204A and 204B. The controller 120 may then use the displacement of the diffracted light images to characterize the sample 104'.

Advantageously, the above-identified image displacement method allows for very large (e.g., 6 orders of magnitude) amplification of actual local displacement of the diffractive elements (e.g., 204A, 204B) of a sample, such as amplification of displacement due to bulk strain. In implementations, tracking the displacement of a single diffracted element enables large increases in per-pixel resolution of generated images due to a decreased field of view (FOV). Moreover, no contact with samples (e.g., 104, 104') is required, and no on-board power to the samples is required, thus enabling remote stand-off sensing of samples to be tested. Moreover, calculations by the controller 120 are insensitive to out of plane displacement of the sample during testing. For example, with reference to FIG. 1, misalignment of the radiation source 102 with a sample 104 will not cause errors when utilizing embodiments of the present disclosure.

Figure 3:
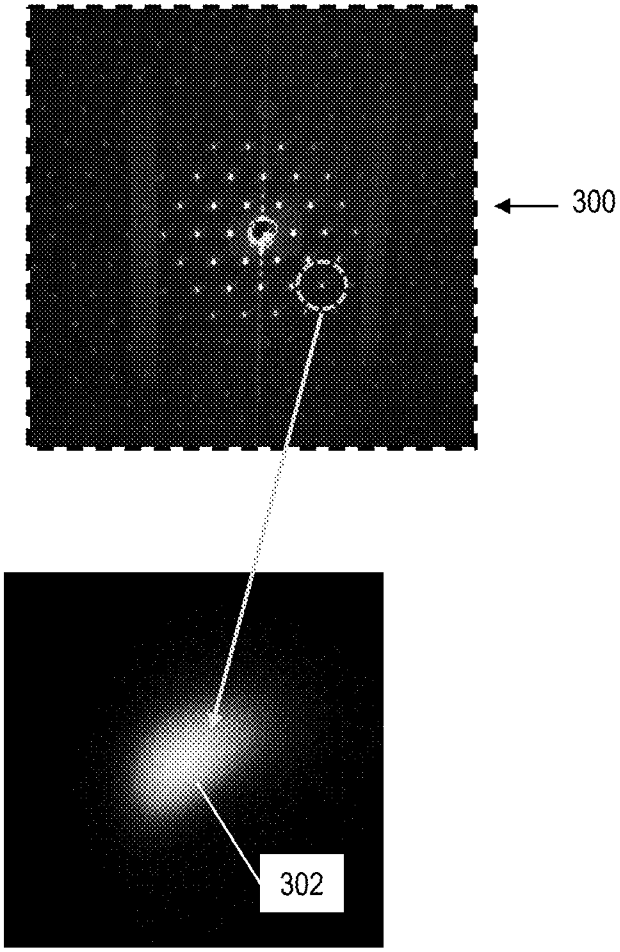
FIG. 3 depicts elements of a diffracted light pattern, one of which is enlarged.

FIG. 3 depicts elements of a diffracted light pattern 300, one of which is enlarged at 302. It should be understood that any type of predetermined pattern may be formed on a sample, and the position of the diffractive elements in the diffracted light pattern may be used to determine physical characteristics of the sample as discussed in more detail below.

Figure 4:
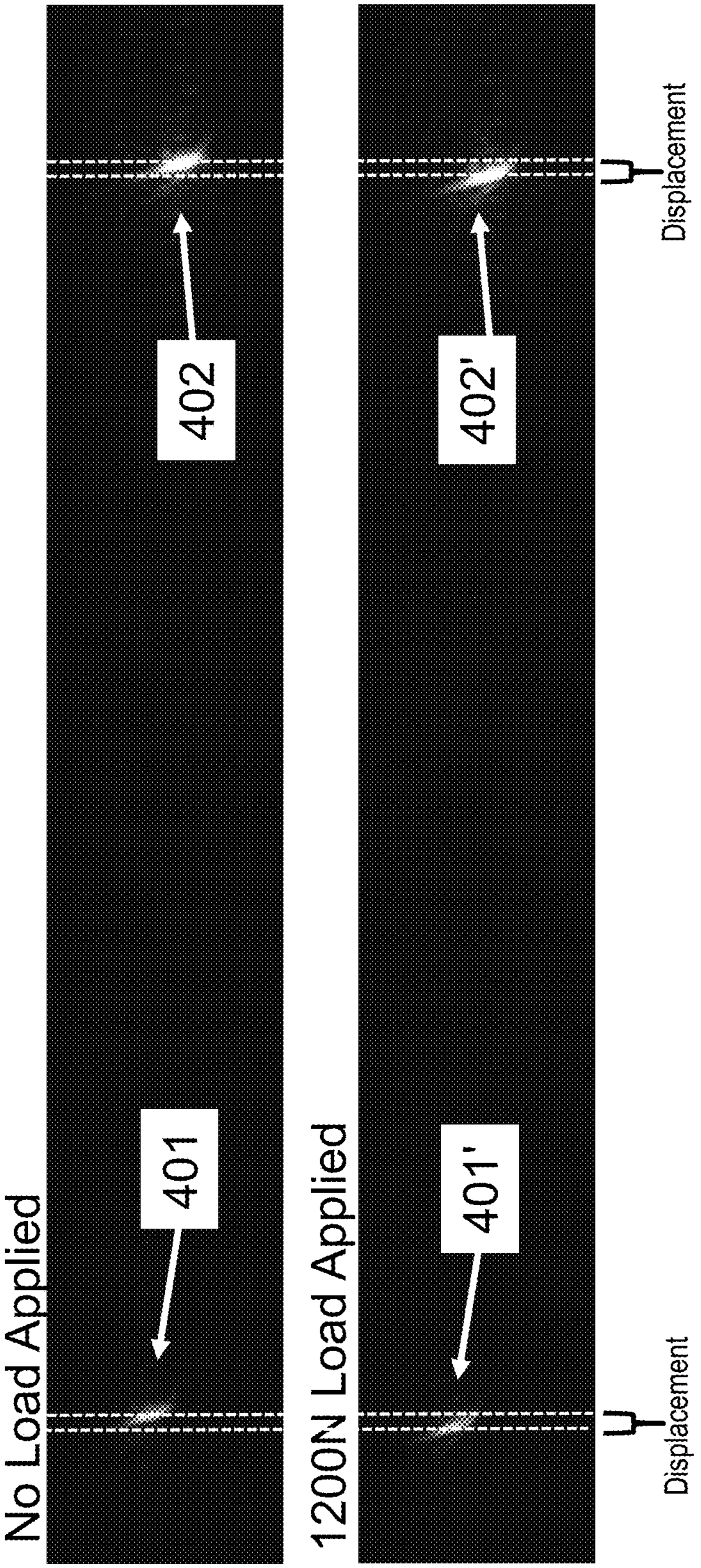
FIG. 4 show a comparison of diffracted element images before a load is applied and after a load is applied.

FIG. 4 show a comparison of diffracted element images obtained before a load is applied and after a load is applied. Specifically, first and second images 401 and 402 of respective diffracted elements are captured after light is applied to a sample that is under no load, and third and fourth images 401' and 402' of the respective diffracted elements are captured after light is applied to the sample under a load of 1200 newtons (N). A displacement of the location (a centroid) of diffracted element images is observed.

Figure 5:
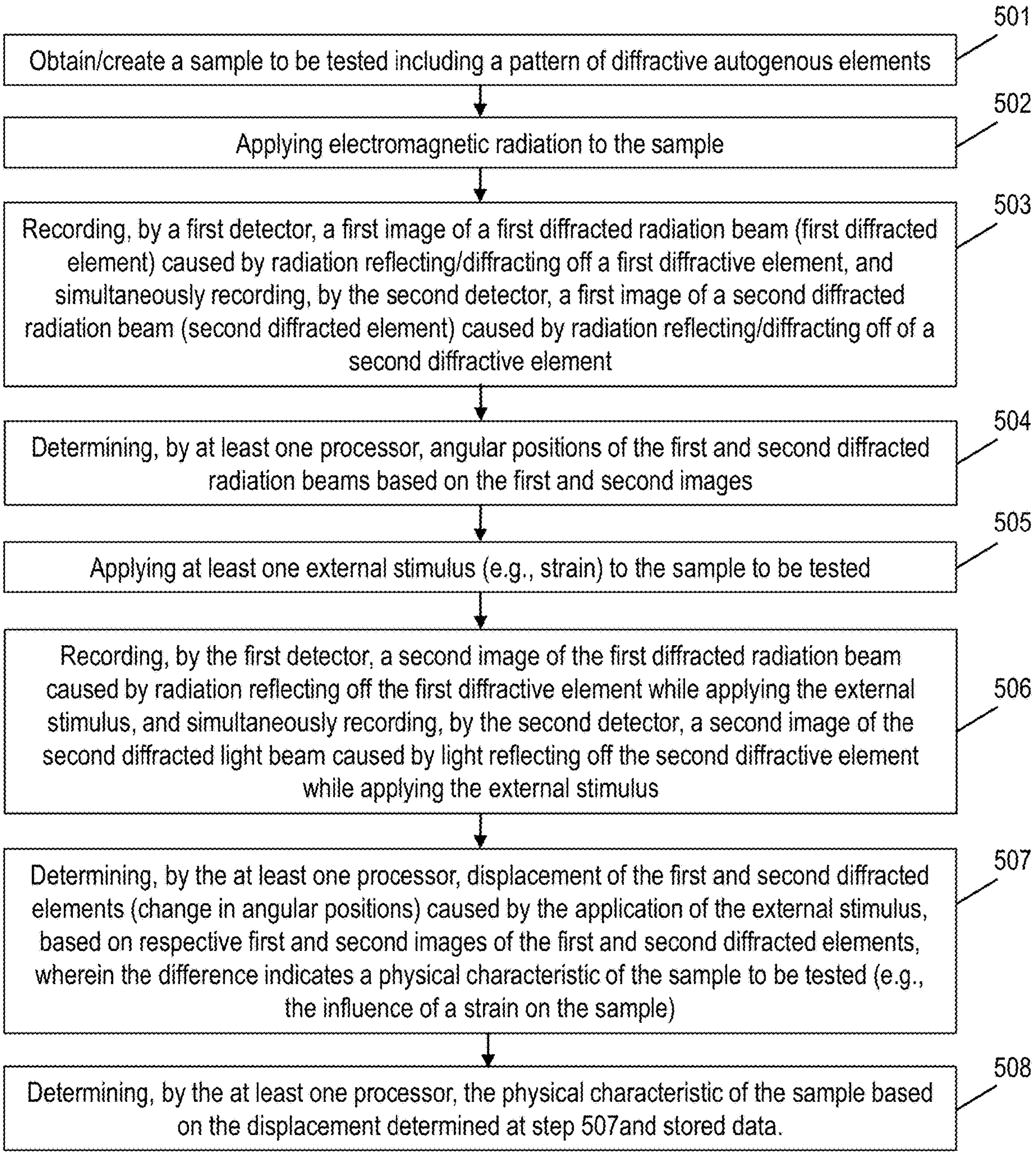
FIG. 5 shows a flowchart of an exemplary method in accordance with aspects of the present invention.

FIG. 5 shows a flowchart of an exemplary method in accordance with aspects of the present invention. The method of FIG. 3 references elements of FIG. 1, and may be implemented using the system 100 of FIG. 1.

In implementations, step 501 includes obtaining or creating a sample to be tested including a pattern of diffractive elements 108. In implementations, the diffractive elements 108 are in the form of indentations formed in a surface of the sample, protrusions extending from a surface of the sample, or a combination of indentations and protrusions. Various methods may be utilized to generate the pattern of diffractive elements 108, and embodiments of the disclosure are not intended to be limited to examples discussed herein. In embodiments, the diffractive elements are formed from the sample itself (i.e., autogenous diffractive elements), such as through etching the sample to form protrusions or indentations. In alternative embodiments, protrusions are formed from a same material as the sample to be tested, such as through vapor deposition. In aspects of the invention, step 501 includes generating the pattern of diffractive elements in a material (sample) to be tested.

In embodiments, step 502 includes applying electromagnetic radiation to the sample 104 via the radiation source 102. In practice, electromagnetic radiation (e.g., light) applied to the sample is reflected/diffracted off of the diffractive elements 108 towards the first and second detectors 114 and 116. In implementations, the radiation source 102 is a light source illuminating the sample (e.g., sample 104). In embodiments, the controller 120 controls the application and/or intensity of the electromagnetic radiation (i.e., turns on an off the radiation source 102). Alternatively, a different controller (not shown) controls the functions of the radiation source 102.

In implementations, step 503 includes recording, by the first detector 114, a first image of a first diffracted element (e.g., from light beam 110) caused by the application of the electromagnetic radiation 106 to the sample 104 when the sample is in a first state. It should be understood that the first diffracted element is an element of a diffracted radiation pattern caused by the electromagnetic radiation imposing on at least one of the diffractive elements of a sample. In one example, the first diffracted element may be 401 of FIG. 4, which is an element of a diffracted radiation pattern caused by electromagnetic radiation imposed on a diffractive element of the sample (e.g., sample 104). Simultaneously, the second detector 116 records a first image of a second diffracted element (e.g., from light beam 112) caused by the application of the electromagnetic radiation 106 to the sample 104 in the initial state. In one example, the second diffracted element may be 402 of FIG. 4, which diffracted radiation pattern caused by electromagnetic radiation imposed on another diffractive element of the sample.

The first state of the sample 104 may be an initial state wherein the sample 104 is not under a stimulus. Alternatively, the first state of the sample 104 may be an initial state wherein the sample is subjected to a first level of stimulus (e.g., a first load). In such cases, step 503 is preceded by the step of applying at least one external stimulus (e.g., an external excitation or load) to the sample 104 before recording the images.

In aspects of the invention, step 504 includes determining, by at least one processor 122 of controller 120, angular positions of the first and second diffracted radiation beams based on the images recorded at steps 503. In implementations, a weighted intensity centroid method is utilized to determine a center of each of the first and second diffracted elements (a center of the image), and the angular positions of the first and second diffracted elements are based on the determined centers.

In implementations, step 505 includes applying at least one external stimulus (e.g., an external excitation or load) to the sample 104. In implementations, the external stimulus is a second level of stimulus different from the first level of stimulus. For example, an initial load may be applied to the sample 104 prior to step 503, and a second load different from the first load (e.g., higher than the first load) may be applied to the sample at step 505. Types of external stimuli that may be applied include strain, heat, cold, and stress, for example. A variety of tools and methods may be used to apply the external stimuli, depending on the type of material/sample characterization desired. Embodiments of the disclosure are not meant to be limited to a particular type of external stimulus.

In embodiments, step 506 includes recording, by the first detector 114, a second image of the first diffracted element caused by the application of the electromagnetic radiation 106 to the sample 104 under the influence of the external stimulus/stimuli (e.g., second degree stimulus) from step 505. Simultaneously, the second detector 116 records a second image of the second diffracted element caused by the application of the electromagnetic radiation 106 to the sample 104 under the influence of the external stimulus/stimuli from step 505.

In aspects of the invention, step 507 includes determining, by at least one processor 122 of controller 120, displacement (change in angular position) of the first diffracted element due to the external stimulus, based on the first and second images of the first diffracted element, and displacement (change in angular position) of the second diffracted element due to the external stimulus, based on the first and second images of the second diffracted element. While only a first and second diffracted element are discussed above, it should be understood that displacement can be calculated for multiple sets of diffracted elements. The determined displacements are related to the displacement of the actual diffracting elements 108 of the sample.

In embodiments, step 508 includes determining, by at least one processor 122 of controller 120, at least one characteristic of the sample 104 based on the displacements determined at step 507 and stored data. In implementations, the controller 120 utilizes locally stored or remotely stored data to determine one or more characteristics of the sample 104 based on the displacement. In embodiments, a plot of element displacement versus a change in external stimulus is generated at step 508, and the characteristic(s) of the sample 104 is determined based on the plot. It should be understood that steps 501-507 may be performed any number of times for images of samples that are under different levels of stimulus (e.g., exposed to different temperatures, etc.), and step 508 may determine the characteristic(s) of the sample 104 based on displacements of diffracted elements over time as the sample is exposed to different levels of stimulus.

Exemplary Process Description

An exemplary method of utilizing the system 100 to obtain a mechanical strain measurement under a quasi-static, uniaxial load is described as follows. A sample material to be tested is fashioned into a typical dog bone geometry. See, for example, sample 104' of FIG. 2. An autogenous periodic surface pattern of diffractive elements (e.g., 108') is then realized on the surface of a gauge section (e.g., 112) of the sample. Upon irradiation with a coherent light source (e.g., a laser), the incident light will be diffracted into a series of outgoing beams from the sample's patterned surface.

First and second detectors (e.g., imaging sensors/cameras) are synchronized such that they capture images of respective diffracted light beam spots simultaneously at the same acquisition rate. The angular positions of the diffracted light beams may be determined through the use of the classical grating equation:

$$\sin(\theta) + \sin(\alpha) = \frac{n\lambda}{d},$$

where $\theta$ is the angular position of the $n^{th}$ order diffracted light beam spot as measured with respect to the grating normal for a light source of wavelength $\lambda$, and a grating with periodic spacing, d, and $\alpha$ is the angle of incidence as measured with respect to the grating normal. Two corresponding diffracted orders (e.g., $n=\pm1$ or $n=\pm2$, etc.) are chosen for imaging. The locations of individual diffraction spots, (e.g., $D_i$) are proportional to the wavelength of laser light, $\lambda$, and the projected distance, L, and inversely proportional to the periodic spacing, d.

The sample material is then subjected to uniaxial loading, while simultaneously imaging the diffracted light beams. Due to the uniaxial load, the light beams translate across the respective detectors, and their respective displacements are determined by the controller (e.g., controller 120 of FIG. 1) via a series of image processing techniques. More specifically, the applied strain $\epsilon$, results in relative displacements of individual features on the surface of the test sample, thus causing corresponding changes in the location of diffracted spots. The relationship between the periodic feature spacing on the physical sample surface, $d(\epsilon)$, and the location of a selected diffracted spot, $D_i(d)$ in reciprocal space allows for a massive amplification (typically~six orders of magnitude), thus enabling an extremely flexible sensing capability. A change in the angular position $\theta$ is determined by the controller, which can then be used to compute a change in grating spacing (d). This change in grating spacing is directly related to the strain experienced by the sample material. In this example, for a known load, and a measured strain, mechanical properties such as Young's Modulus may then be determined by the controller. As is known in the art, Young's modulus, E, quantifies the relationship between tensile or compressive stress $\sigma$ (force per unit area) and axial strain $\varepsilon$ (proportional deformation) in the linear elastic region of a material, which is expressed as:

$$E = \frac{\sigma}{\epsilon}$$

Figure 6:
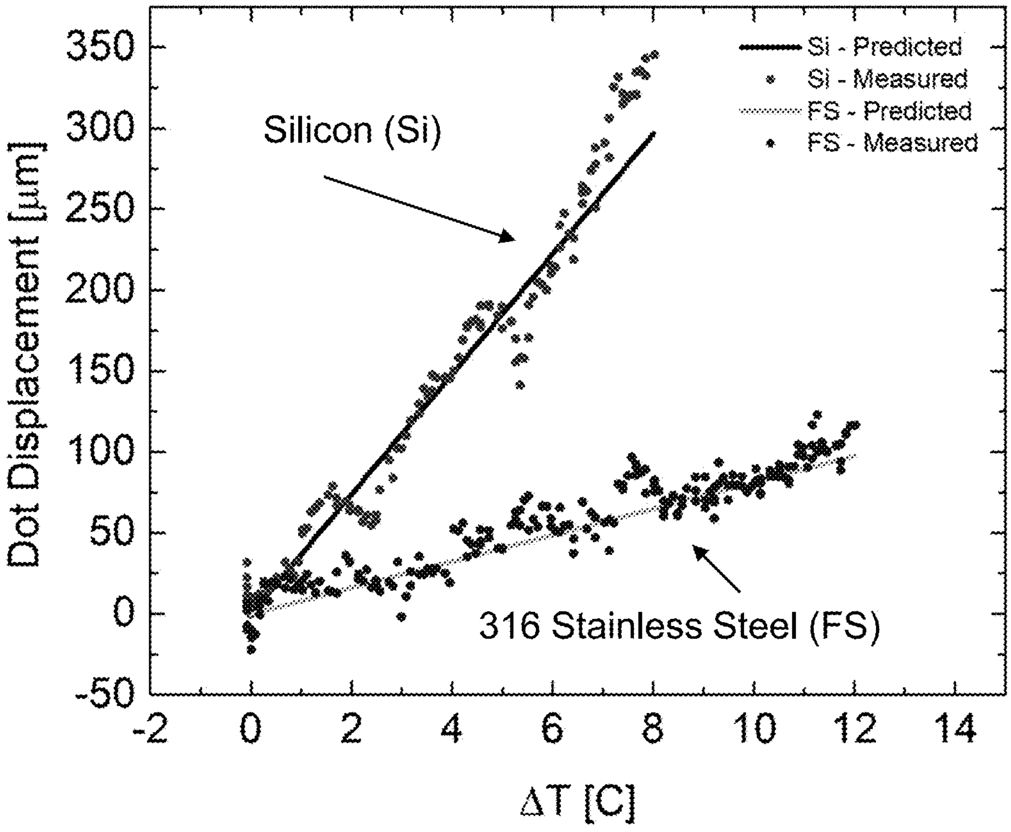
FIG. 6 is a chart plotting change in temperature versus diffracted element displacement.

FIG. 6 is a chart 600 plotting a change in temperature versus diffracted element displacement based on results from an exemplary experiment. In the experiment, silicon and 316 stainless steel were selected as test materials due to their well-known coefficients of thermal expansion (CTE), and test samples were prepared. More specifically, a test sample of 316 stainless steel was prepare with an autogenous diffractive pattern of elements formed therein, and a test sample of silicon was also prepared with a diffractive pattern of elements formed therein. The 316 stainless steel sample was illuminated by a laser light, and images of first and second diffracted elements of the 316 stainless steel sample were captured over a range of different temperatures. The silicon sample was likewise illuminated by the laser light and images of first and second diffracted elements of the silicon sample were captured over the range of different temperatures. Displacement of the first and second diffracted elements were determined (in microns) for the silicon and 316 stainless steel samples, and were plotted in the chart 600 along with predicted changes in temperature based on known CTEs of silicon and 316 stainless steel. As depicted in chart 600, the displacement of diffracted elements closely followed the predicted plots for both the silicon and 316 stainless steel samples. Thus, measuring displacement of diffracted elements in accordance with embodiments of the invention has been shown to enable the accurate determination of material characteristics.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A non-contact material assessment system comprising:
- a radiation source configured to apply electromagnetic radiation to a sample including a pattern of autogenous diffractive elements, thereby generating a pattern of diffracted elements;
- at least one detector configured to:
  - capture a first image of a first diffracted element when the sample is in an initial state, and a second image of the first diffracted element when the sample is subjected to an external stimulus in a second state; and
  - capture a first image of a second diffracted element when the sample is in the initial state, and a second image of the second diffracted element when the sample is subjected to the external stimulus in the second state; and
- a controller comprising at least one computer processor, one or more computer readable storage media, and program instructions collectively stored on the one or more computer readable storage media, the program instructions executable to:
  - determine a displacement of the first diffracted element based on the first and second images of the first diffracted element;
  - determine a displacement of the second diffracted element based on the first and second images of the second diffracted element; and determine a characteristic of the sample over an assessment period based on the displacement of the first diffracted element and the displacement of the second diffracted element.

2. The non-contact material assessment system of claim 1, further comprising a means for applying the external stimulus to the sample.

3. The non-contact material assessment system of claim 1, wherein the characteristic is selected from the group consisting of: strain, coefficient of thermal expansion, phase transformation temperature, and yield stress.

4. The non-contact material assessment system of claim 1, wherein the autogenous diffractive elements are selected from the group consisting of: indentations in a surface of the sample, raised surface features of the sample, and a combination of indentations and raised surface features of the sample.

5. The non-contact material assessment system of claim 1, wherein the electromagnetic radiation comprises wavelengths within the visible spectrum.

6. The non-contact material assessment system of claim 1, wherein the stimulus is selected from the group consisting of: thermal stress, mechanical stress, and electromagnetic excitation.

7. The non-contact material assessment system of claim 1, wherein the at least one detector comprises a first imaging sensor and a second imaging sensor, and wherein:

the first imaging sensor is configured to capture the first image of the first diffracted element when the sample is in the initial state, and the second image of the first diffracted element when the sample is subjected to the external stimulus in the second state; and the second imaging sensor is configured to capture the first image of the second diffracted element when the sample is in the initial state, and the second image of the second diffracted element when the sample is subjected to the external stimulus in the second state.

8. The non-contact material assessment system of claim 1, further comprising one or more optical elements configured to redirect the electromagnetic radiation or one or more diffracted elements of the pattern of diffracted elements.

9. The non-contact material assessment system of claim 1, further comprising a testing environment configured to house the sample and control an environment of the sample during the assessment period.

10. The non-contact material assessment system of claim 9, wherein the testing environment comprises a cooler or a heater.

11. A method of performing a non-contact material assessment, comprising:

applying electromagnetic radiation to a sample including a pattern of autogenous diffractive elements, thereby generating a pattern of diffracted elements;

capturing, by at least one detector, a first image of a first diffracted element when the sample is in an initial state, and a second image of the first diffracted element when the sample is subjected to an external stimulus in a second state;

capturing, by the at least one detector, a first image of a second diffracted element when the sample is in the initial state, and a second image of the second diffracted element when the sample is subjected to the external stimulus in the second state;

determining, by a controller, a displacement of the first diffracted element based on the first and second images of the first diffracted element;

determining, by the controller, a displacement of the second diffracted element based on the first and second images of the second diffracted element; and determining, by the controller, a characteristic of the sample over an assessment period based on the displacement of the first diffracted element and the displacement of the second diffracted element.

12. The method of claim 11, further comprising forming the pattern of autogenous diffractive elements on the sample.

13. The method of claim 11, wherein the forming the pattern of autogenous diffractive elements is selected from the group consisting of: sputter depositing material on a surface of the sample; and removing material from the surface of the sample.

14. The method of claim 11, wherein the determining the characteristic over the assessment period is further based on brightness or intensity of the first and second diffracted element over the assessment period.

15. The method of claim 11, wherein the stimulus is selected from the group consisting of: thermal stress, mechanical stress, and electromagnetic excitation.

16. The method of claim 11, wherein the at least one detector comprises a first imaging sensor and a second imaging sensor, and wherein:

the first imaging sensor is configured to capture the first image of the first diffracted element when the sample is in the initial state, and the second image of the first diffracted element when the sample is subjected to the external stimulus in the second state; and the second imaging sensor is configured to capture the first image of the second diffracted element when the sample is in the initial state, and the second image of the second diffracted element when the sample is subjected to the external stimulus in the second state.

17. The method of claim 11, further comprising adjusting a control on an environment housing the sample to subject the sample to a predetermined environment during the assessment period.

18. The method of claim 11, wherein the testing environment comprises a cooler or a heater.

19. The method of claim 11, further comprising applying the external stimulus to the sample.

20. The method of claim 19, wherein the external stimulus is selected from the group consisting of: thermal stress, mechanical stress, and electromagnetic excitation.

* * * * *